(12) United States Patent
Holland

(10) Patent No.: US 11,700,794 B2
(45) Date of Patent: Jul. 18, 2023

(54) PLANT GROWTH VIA VIBRATIONS

(71) Applicant: THE HUMAN CONNEXION, LLC, Cary, NC (US)

(72) Inventor: Glenn Holland, Cary, NC (US)

(73) Assignee: THE HUMAN CONNEXION, LLC, Cary, NC (US)

( * ) Notice: Subject to any disclaimer, the term of this patent is extended or adjusted under 35 U.S.C. 154(b) by 0 days.

(21) Appl. No.: 17/365,859

(22) Filed: Jul. 1, 2021

(65) Prior Publication Data
US 2022/0015302 A1 Jan. 20, 2022

Related U.S. Application Data

(60) Provisional application No. 63/052,540, filed on Jul. 16, 2020.

(51) Int. Cl.
*A01G 7/04* (2006.01)
*G01H 17/00* (2006.01)

(52) U.S. Cl.
CPC .............. *A01G 7/04* (2013.01); *G01H 17/00* (2013.01)

(58) Field of Classification Search
CPC .... A01G 7/04; A01G 2017/065; A01G 17/08; A01G 17/06
USPC ................................................... 47/58.1 LS
See application file for complete search history.

(56) References Cited

U.S. PATENT DOCUMENTS

| | | | | |
|---|---|---|---|---|
| 1,941,517 A | * | 1/1934 | Tincu | A01G 17/06 47/47 |
| 4,329,811 A | * | 5/1982 | Coulson | A01G 17/06 47/46 |
| 5,077,934 A | * | 1/1992 | Liboff | A01G 7/04 47/1.3 |
| 5,819,467 A | * | 10/1998 | Zucker | A01G 7/04 47/60 |
| 10,757,869 B1 | * | 9/2020 | Yost | A01G 7/04 |
| 2008/0271372 A1 | * | 11/2008 | Wang | A01G 9/02 47/66.6 |
| 2012/0222350 A1 | * | 9/2012 | Yan | A01G 7/04 422/128 |
| 2014/0225003 A1 | * | 8/2014 | Koo | A01G 7/04 250/454.11 |
| 2016/0198637 A1 | * | 7/2016 | Mirzakhani Nafchi | A01G 7/04 47/1.3 |
| 2020/0205446 A1 | * | 7/2020 | Ching | A23B 7/015 |
| 2020/0329653 A1 | * | 10/2020 | Hall | A01G 31/02 |
| 2022/0238247 A1 | * | 7/2022 | Choi | G21K 5/08 |

FOREIGN PATENT DOCUMENTS

| | | | |
|---|---|---|---|
| EP | 0477781 A1 * | 4/1992 | ............ A01G 7/04 |
| FR | 2648194 A1 * | 12/1990 | |

* cited by examiner

*Primary Examiner* — Christopher D Hutchens
(74) *Attorney, Agent, or Firm* — Dorsey & Whitney LLP

(57) ABSTRACT

The present disclosure relates to systems and methods of applying vibration stimuli to a plant. In some implementations, an actuator generates a vibration. The vibration may be transmitted to a vibration transmitter and from the vibration transmitter to the plant. In some implementations, the vibration may be based on recorded biometric information such as a heartbeat, pulse, nerve impulses, or the like.

13 Claims, 9 Drawing Sheets

PLANT GROWTH VIA VIBRATIONS

CROSS REFERENCE TO RELATED APPLICATIONS

The present application claims priority under 35 U.S.C. § 119 to U.S. Provisional Application No. 63/052,540 entitled "Improved Plant Growth via Vibrations," filed on Jul. 16, 2021 and incorporated by reference herein for all purposes.

FIELD

This application is generally directed to methods to increase or improve plant growth.

BACKGROUND

Plants have been cultivated and grown for human food (e.g., fruits, vegetables, mushrooms, herbs, grains, etc.); animal forage (e.g., corn, hay, alfalfa, etc.); fiber (e.g., hemp, cotton, flax, jute, etc.); medicinal uses (e.g., digitalis, feverfew, etc.); decoration (e.g., flowers); landscaping (e.g., trees, ornamental grasses, turf, shrubs, etc.); and many other reasons. Most plant growth is a slow, time consuming process, that may not have an individualized impact for the grower. While there have been improvements in fertilizer application, pest control, crop rotation, hydroponics, artificial lighting, and the like, there are still many other aspects that impact plant growth that could enhance growth and the growing experience.

BRIEF SUMMARY

A system for applying a vibration to a plant is disclosed. The system includes an actuator configured to generate a vibration; and a vibration transmitter configured to transmit the vibration to the plant.

A method of growing a plant is disclosed. The method includes receiving vibration content; storing the vibration content in a computer readable medium; retrieving the vibration content; and vibrating the plant with a vibration based on the vibration content. In some implementations, the vibration content includes biometric information such as a heartbeat, pulse, brain activity, or breath sounds. In some implementations, the vibration content is converted to an electrical signal; the electrical signal is received by an actuator; and the actuator generates the vibration based on the electrical signal. The vibration may be transmitted from the actuator to a vibration transmitter attached to the plant; and the vibration transmitter transmits the vibration to the plant.

In some implementations, the actuator includes a vibration speaker. The actuator may be attached to an actuator support including an upper plate and a lower plate. The vibration transmitter may include a screen, a portion of which is disposed between the upper plate and the lower plate. The upper plate, the portion of the vibration transmitter, and the lower plate may be attached together by a fastener. A transmitter support may be attached to and support the vibration transmitter, the actuator support, and the actuator. The plant may be attached to the vibration transmitter by a plant link, such that the vibration is transmitted from the actuator to the actuator support, from the actuator support to the vibration transmitter, and from the vibration transmitter to the plant.

DETAILED DESCRIPTION

Figure 1:
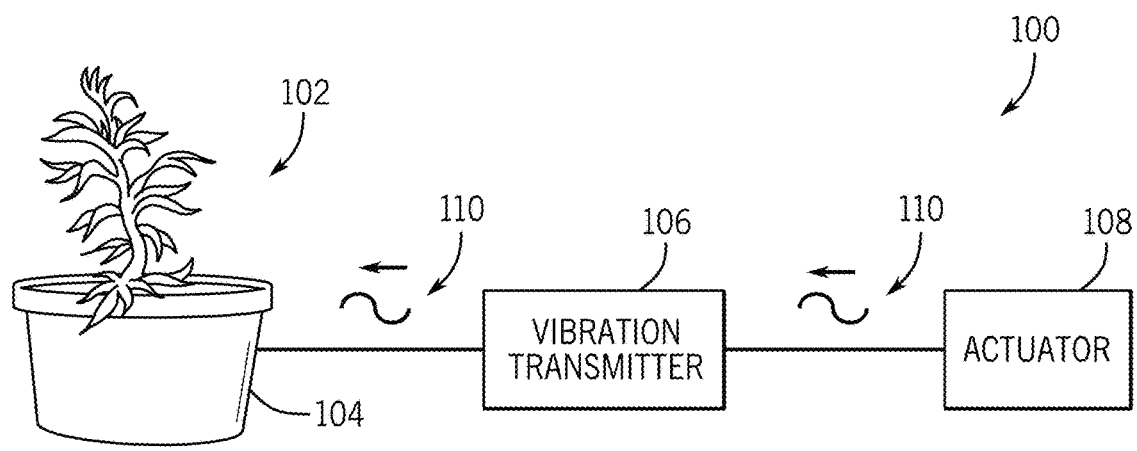
FIG. 1 is a simplified schematic of a vibration system to apply stimuli to a plant.

The present disclosure relates to systems and methods of applying vibration stimuli to a plant. As used herein, "plant" refers to any member of the taxonomic biological kingdom "Plantae" or "Fungi". As used herein, "vibration" refers to kinetic energy applied to a plant at any stage of growth, e.g., seed, growth stage, or harvested. In many embodiments, the vibration is in the form of an acoustic wave or mechanical wave, but other forms of kinetic energy may be used as well, such as sub-sonic or ultrasonic vibrations. For example, an acoustic wave may be a type of energy propagation through a medium by means of adiabatic compression and decompression. In another example, a mechanical wave may be a vibration not capable of transmitting energy through a vacuum, but that can transmit energy through a medium such as a solid, liquid, or a gas. Plants subjected to vibrations may produce greater yields, have higher nutrient levels, grow more compactly such that more plants can be grown in a smaller space, and/or reach harvest maturity sooner.

In many implementations, a vibration such as a sound may be captured, e.g., recorded. In some implementations, vibration content may be captured (e.g., by a microphone) and converted by an actuator (e.g., amplified and played by a speaker) without recording the vibration. In some examples, a person may speak, sing, hum, or make other sounds that are captured and played live by an actuator. The vibration may then be used to actuate an actuator that is coupled to a plant such that the recorded vibration is applied to a plant. The actuator may be connected to an actuator support that supports the actuator and transmits the vibrations to a transmitter, which may be coupled to portions of the plant. In some implementations, the actuator support amplifies the vibration. As one example, the actuator may be a vibration speaker that produces vibrations in response to a sound recording. In this example, the actuator may be supported on a transmission mesh, where portions of the plant are coupled to the transmission mesh. In this manner, vibrations generated by the actuator (either in original state or optionally amplified), are applied to the portions of the plant. In this example, the mesh structure of the transmitter allows for light, water, and nutrients to be provided to the plants, but still effectively transmit the vibrations thereto.

Plants grown with vibration, such as the ones provided via the vibration system, may help form a personal connection between people. For example, the vibration content used to generate the applied vibrations may be individualized or customized by a user, e.g., a user may select a favorite song, a series of sounds, or the like. In one embodiment, the vibration content may include a recording of a user's heartbeat, which may then be applied via the vibration system to a selected plant, such as a flowering plant. As the plant grows, the user may form a personal connection with the plant and gift the plant to another person whom the user wants to establish a personal connection or demonstrate a personal connection, such as a significant other, friend, parent, child, or the like.

FIG. 1 is a simplified schematic of a system 100 for applying vibration to a plant 102. The system 100 includes a plant 102, which may be growing in a growing medium 104. The system 100 includes an actuator 108 that generates vibration 110. The vibration 110 is transmitted from the actuator 108 to the plant 102 via a transmitter 106. In some implementations, the actuator 108 may be in direct contact with a plant 102, such that no vibration transmitter 106 is used.

The plant 102 can be any type of plant. Some examples are: fruits like tomatoes, melons, or peppers; vegetables like lettuce, spinach, carrots; medicinal plants like chamomile, Echinacea, or feverfew; fiber such as hemp, jute, or flax; animal fodder like corn, sorghum, wheat; and so on. The plant 102 may be grown indoors, such as in a greenhouse, grow house, grow tent, or the like, may be grown outdoors, or a combination of the two (e.g., moved indoors at certain stages of growth).

The growing medium 104 may be any suitable matter that supports the growth of the plant 102. For example, the growing medium 104 may be soil, bark, scoria, gravel, compost, pearlite, vermiculite, or the like. The growing medium 104 may be a hydroponic and/or aeroponic structure that supplies nutrient-laden water to the roots of the plant 102. The growing medium 104 may be contained in a container such as a pot, bag, net, or the like, or may not be contained, such as in a field, yard, or the like.

The actuator 108 is any suitable device that can generate a vibration 110. In many implementations, the actuator 108 is an electro-mechanical conversion device or other transducer that converts electrical energy to kinetic energy. For example, the actuator 108 may include an inductive coil and a magnet, such that electrical signals applied to the coil form a magnetic field that interacts with the magnet, which causes the magnet to move correspondingly, vibrating the actuator 108. The actuator 108 may be a speaker, such as a vibration speaker. In some implementations, the actuator 108 may convert other forms of energy into kinetic energy. For example, the actuator 108 may be an engine that converts stored chemical energy (e.g., fuel) into kinetic energy. In some examples, the actuator 108 may be an electric motor or solenoid that converts electrical energy into kinetic energy. The power output of an actuator 108 may be selected based on the number of plants 102 to be grown, the types of plants, the area of the vibration transmitter 106, or the like. In one example, an actuator 108 having about 26 W of power output may apply vibrations to a vibration transmitter 106 with a surface area of about 9 square feet (e.g., a 3 foot by 3 foot square). In some implementations, the actuator 108 includes a smart speaker. The smart speaker may enable a user to interface with the system 100 by voice command. For example, a user could speak to the smart speaker and tell it to play a certain vibration content such as a song, biometric recording, frequency, or the like. The smart speaker may recognize the voice command and perform a corresponding action, such as playing the requested vibration content.

The actuator 108 may generate any suitable frequency or amplitude of vibration 110. In many implementations, the vibration 110 may be audible to the human ear (e.g., may have a frequency from about 20 Hz to about 20 kHz). In some implementations, the vibration 110 may be ultrasonic, having a frequency above the range of human hearing. In some implementations, the vibration 110 be subsonic, having a frequency below the range of human hearing.

The actuator may be able to either connect to or receive analog and/or digital content, such as an audio file, that can be used to generate the vibrations. The actuator may connect to another device, a network, and/or have a memory component with stored content that can be used to generate vibrations. The actuator 108 may have a processing element to allow it cycle through different content, generating vibrations from each. For example, the actuator 108 may play a playlist of songs in a given order or a random order. In some implementations, the actuator may receive a wireless transmission of vibration content such as a radio (either terrestrial or satellite-based), television, cable or similar broadcast.

In some implementations, the vibration 110 may have a single frequency (e.g., a 60-Hz wave). In some implementations, the vibration 110 may have a single waveform (e.g., a sine, saw-tooth, or square wave). However, in many implementations, the vibration 110 may include complex combinations of frequencies, amplitudes, and/or waveforms (e.g., music like Beethoven's fifth symphony, a heartbeat, a mother singing a lullaby, or the like).

In some implementations, the system 100 may include a vibration sensor (e.g., an accelerometer, gyroscope, or the like) that can record the vibration 110 to be applied to the plant. Such a vibration sensor may capture data related to the vibration 110, such as a frequency, amplitude, or other characteristics. The system 100 may record the captured data and display it in a graphical form, such as a time series, histogram, power spectrum, Bode diagram, or the like. A vibration sensor may be used to control or tune the vibration 110. For example, a vibration sensor may measure the amount of vibration applied to the plant 102 and the amplitude of the vibration 110 may be increased or decreased.

Figure 2:
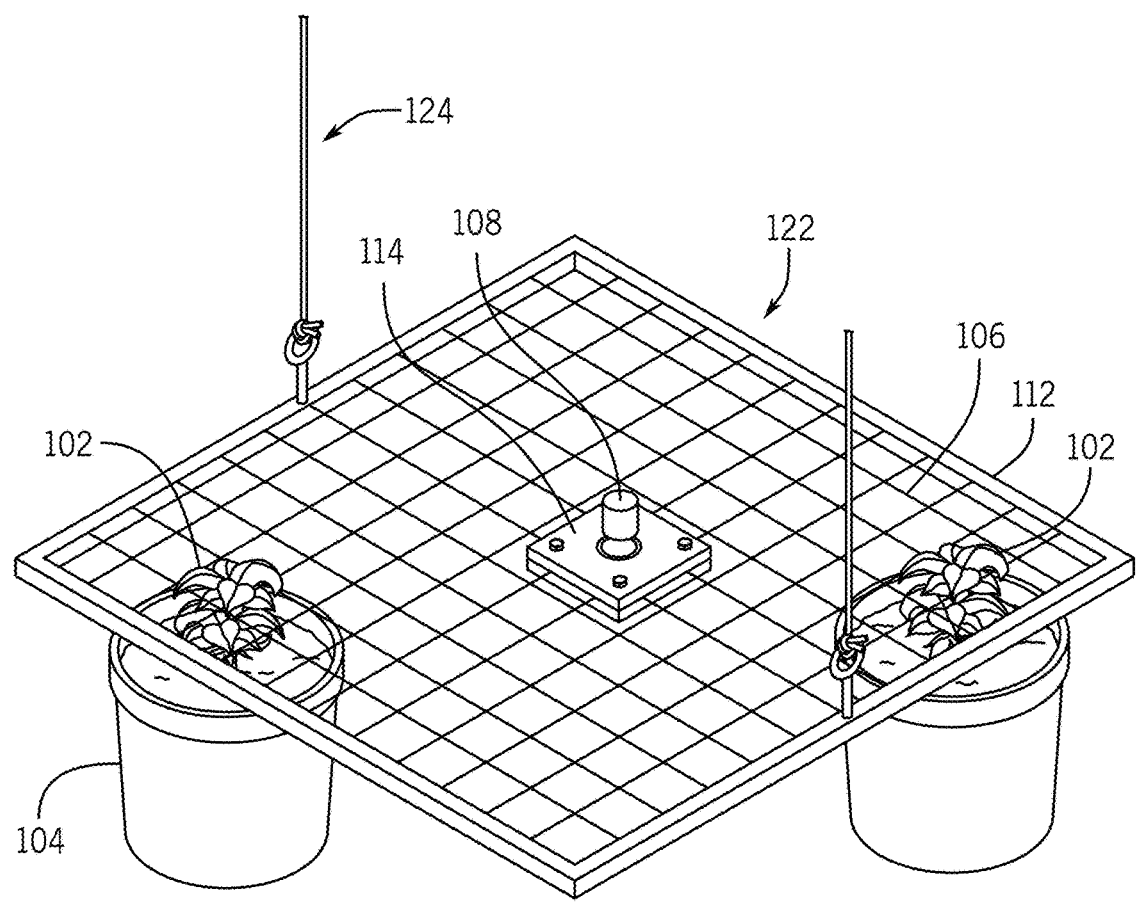
FIG. 2 is a top isometric view of an embodiment of the system of FIG. 1.
Figure 3:
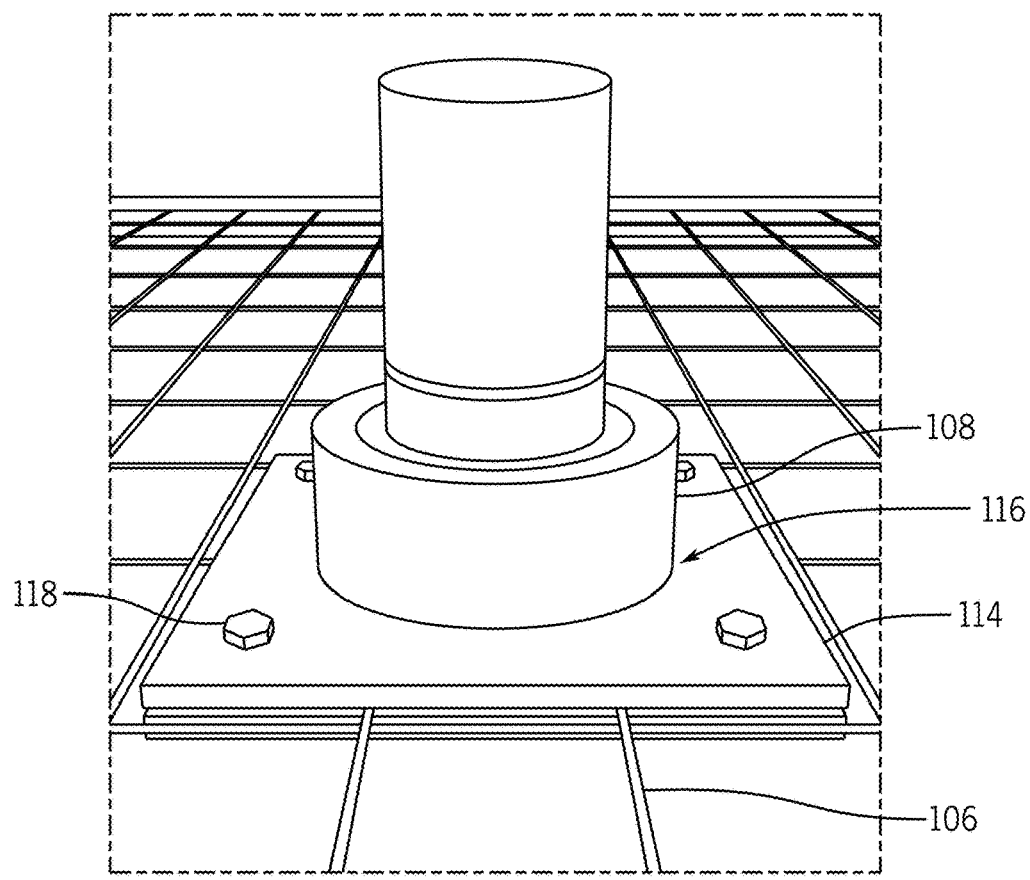
FIG. 3 is a detailed view of a portion of the system of FIG. 2.
Figure 4:
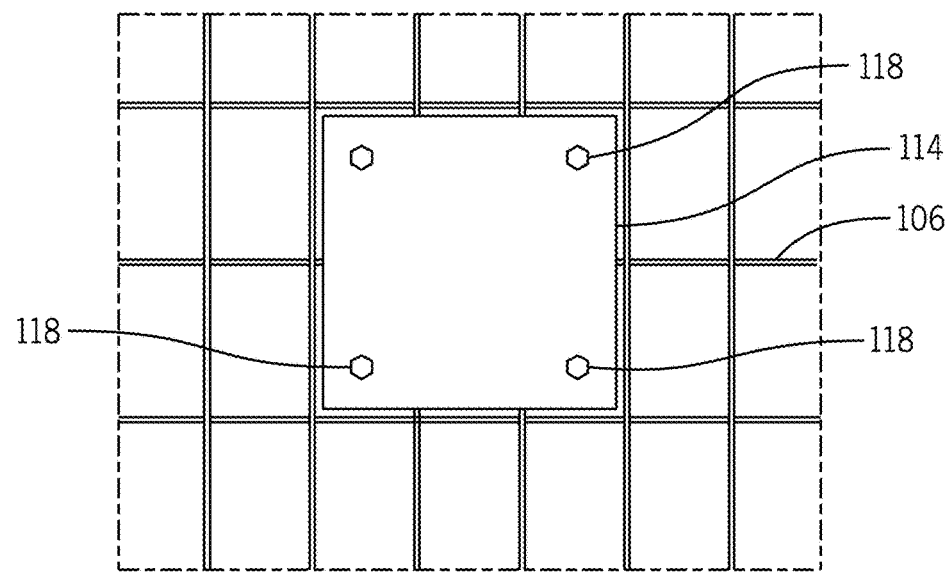
FIG. 4 is a partial top plan view of a portion of the system of FIG. 2.

FIG. 2 shows an implementation of the system 100 of FIG. 1. Additional details of the system 100 are shown in FIG. 3 and FIG. 4. The system may include one or more of the actuator 108, an actuator support 114, a vibration transmitter 106, and a transmitter support 112.

The actuator support 114 may be any structure that can provide structural support an actuator 108. The support may accept vibration from the actuator 108. In the example of FIG. 2, the actuator support 114 is a plate-like structure or transfer plate. In some implementations, the actuator support 114 includes a top plate and a bottom plate. The top and bottom plates may be joined by one or more fasteners 118. The actuator support may be any suitable shape such as a square, rectangle, triangle, circle, other polygons, or irregular shapes. In some implementations, the fasteners 118 may be bolts, screws, rivets, pins, adhesives, or the like. The actuator support 114 may have other suitable shapes, including rods, spheres, cones, or the like. The actuator support 114 may be sufficiently rigid and strong to support the weight of the actuator 108 and may include barriers or restraints that help keep the actuator 108 in place. In many implementations, the actuator support maybe corrosion resistant, to reduce damage due to the moist environment of many planting locations and/or chemicals (e.g., pesticides, fertilizers, or the like in the planting area) Alternatively, the actuator support 114 may be omitted and an actuator 108 may be supported by a plant itself, the vibration transmitter, or the growing medium.

The actuator support 114 may be made of any suitable material that can support the actuator and can transmit vibration 110 between an actuator 108 and a plant 102. In many implementations, the actuator support 114 is aluminum. In some implementations, the actuator support 114 or vibration transmitter 106 may be other metals such as brass, copper, steel, iron; plastics such as a thermoplastic or thermoset; glass or ceramic; natural fibers such as wood, bamboo, or the like; combinations of these materials; or the like.

The vibration transmitter 106 may be any suitable member that transmits vibration into a plant material. For example, the vibration transmitter 106 may be a screen or mesh. In some examples, the vibration transmitter may be a fabric under sufficient tension to allow transmission of the vibrations without substantial attenuation. The screen may be any suitable shape or pattern with sufficient spacing to receive a plant into the gaps in the screen, such as to allow the plant growth to grow through or around portions of the screen. The pitch (spacing in the filaments of the screen) may be adapted based on the type of plant being grown. For example, when the plant 102 is turf grass, the vibration transmitter 106 may be a screen with a fine pitch (e.g., 1-mm, 5-mm, or 10-mm), such that the screen may contact many blades of grass. In another example, when the plant 102 is a tree, the pitch of the screen may a larger screen, on the order of an inch or more. Likewise, the size of the vibration transmitter 106 may be varied depending on the number, size, or types of plants 102 being grown. In some implementations, the vibration transmitter 106 may be a rod, shaft, wire, or the like.

The vibration transmitter 106 may be made of any suitable material that can transmit vibration 110 between an actuator 108 and a plant 102. In many implementations, the vibration transmitter 106 is aluminum. In some implementations, the vibration transmitter 106 may be other metals such as brass, copper, steel, iron; plastics such as a thermoplastic or thermoset; synthetic fabrics such as polyester, polypropylene, nylon, synthetic silk, or blends thereof with other natural or synthetic materials; glass or ceramic; natural fibers such as wood, bamboo, silk, or the like; combinations of these materials; plastic coated metal wire; or the like.

The transmitter support 112 may be any suitable structure that can support a vibration transmitter 106, an actuator support 114, and an actuator 108. In some examples, the actuator support 114 is a frame mounted to the vibration transmitter 106. In many examples, the actuator support 114 may be a rectangle, however the actuator support 114 may be any suitable shape, including a circle, square, oval, a polygon, or an irregular shape and in many instances is defined by the growth area (e.g., area of where the plants are dispersed). The transmitter support 112 may be formed of members with a geometric cross section. In some examples, the members may have a U-shaped cross section. A U-shaped cross section may receive a portion of the vibration transmitter 106 and may be crimped or welded on the received portion to secure the vibration transmitter 106 to the transmitter support 112.

The transmitter support 112 may be any suitable material sufficiently rigid to provide structural support for the actuator 108, actuator support 114, and/or the vibration transmitter 106. Some examples include metals such as aluminum, brass, copper, steel, iron; plastics such as a thermoplastic or thermoset; glass or ceramic; natural fibers such as wood, bamboo, or the like; combinations of these materials; or the like. The transmitter support 112 may be attached to the vibration transmitter 106 by any suitable method or device, such as a screw, bolt, welding A transmitter support 112 may be optional, such that some implementations do not include a transmitter support 112. In many implementations, the vibration transmitter 106 spans across an opening defined by the transmitter support 112. For example, the vibration transmitter 106 may be a mesh strung under tension across the opening in the transmitter support 112. The transmitter support 112 may provide or maintain tension to the vibration transmitter 106, such as to enhance vibration transmission.

In the assembled system 100, the actuator 108 may be connected to the actuator support 114. In one example, shown in FIG. 3, the actuator 108 may include an actuator attachment portion 116 that couples the actuator 108 to the actuator support 114. The actuator attachment portion may hold or position the actuator 108 on the actuator support 114. The attachment portion 116 may be attached to the actuator 108, the actuator support 114, or both. The actuator attachment portion 116 may be any suitable device configured to connect the actuator 108 to the actuator support 114 such that the vibration 110 can propagate from the actuator 108 to the actuator support 114. In many implementations, the actuator attachment portion 116 is a vacuum attachment device such as a suction cup. In some implementations the attachment portion 116 may be a raised protrusion that defines a well in which the actuator 108 sits, etc. In other implementations, the attachment portion 116 may be integrally or unitarily formed with the actuator 108, such that the actuator 108 by the attachment portion 116 attaches directly to a vibration transmitter 106. For example, the actuator 108 may include an attachment portion 116 such that the actuator 108 may attach directly to a vibration transmitter 116 provided as a mesh or screen. In some implementations, the actuator attachment portion 116 may be a bolt, screw, threaded interface, adhesive, hook-and-loop fastener, spline, key and keyway, combinations of devices, or the like. In some implementations, a suction cup may have adhesive on one side to adhere the actuator attachment portion 116 to the actuator support 114.

The actuator support 114 may be connected to a vibration transmitter 106 so as to transmit vibrations thereto. In one example, a portion of the vibration transmitter 106 is disposed between the upper and lower plates of the actuator support 114. One or more fasteners 118 may secure the upper plate to the lower plate and thus attach the plates together to hold the vibration transmitter 106 therebetween. The fasteners 118 may form a secure connection between the upper and lower plates such that the vibration 110 may be transmitted from the actuator 108 through the actuator support 114 and to the vibration transmitter 106. In some implementations, the upper and lower plates are approximately 1/16" to 1/8" thick. Other thicknesses may be used. The size of the actuator support 114 may be selected based on the size and/or shape of the vibration transmitter 106 and/or actuator 108. The actuator support 114 may be placed in any suitable location where it can contact the vibration transmitter 106 and/or the transmitter support 112.

The actuator 108, actuator support 114, and vibration transmitter 106 may be supported by a transmitter support 112. The actuator 108, vibration transmitter 106, transmitter support 112, and actuator support 114 may form a vibration unit 122. The vibration unit 122 may be in the form of a rack. In some implementations, multiple vibration units 122 may be placed into holding racks such as for transport, drying, curing, harvesting, or the like. The vibration unit 122 may be disposed in any suitable orientation or position that may be beneficial to plant growth. For example, a vibration unit 122 may be placed horizontally, vertically, or at one or more angles therebetween.

The system 100 may include a plant link 120 or a connector link. A plant link 120 may be any device or structure suitable to couple a portion of a plant 102 to a vibration transmitter 106 such that a vibration 110 may be transmitted from the vibration transmitter 106 to the plant 102. As one example, the plant link 120 may couple the plant portion adjacent to a portion of the transmitter such that there is direct contact between the two along a coupling surface. The plant link 120 may transmit the vibration to the plant 102. For example, a vibration 110, or a portion of a vibration 100, may be transmitted through the vibration transmitter 106 to the plant link 120 and into the plant 102.

Figure 5:
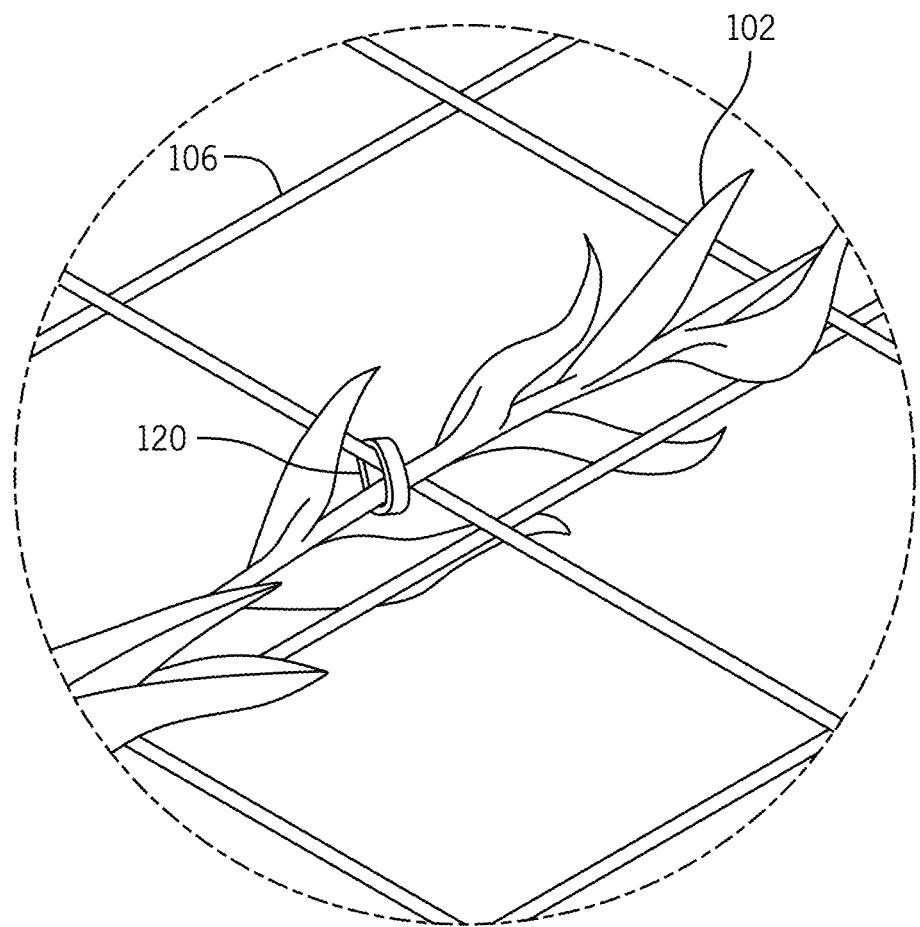
FIG. 5 is a detail view of a plant link taken at line 5-5 of FIG. 7A.

FIG. 5 illustrates an example of a plant link 120. A plant link 120 may be configured to hold the plant 102 to the vibration transmitter 106 tightly enough to enable a vibration 110 to pass to the plant 102 from the vibration transmitter 106. A plant link 120 may also be configured not to constrict the plant 102, such that the plant's biological processes may continue to take place. For example, the plant link 120 may hold the plant 102 loosely enough to allow nutrients, fluids, waste, and other transport associated with the plant's biological processes to continue. The plant link 120 may be expandable, such that it can accommodate growth of the plant 102 without compromising the transmission of vibrations nor the plant's processes. In some implementations, more than one plant link 120 may attach a plant 102 to the vibration transmitter 106. In some implementations, the system 100 may not include a plant link 120, such as in implementations where an actuator 108 is attached directly to a plant 102, or where a vibration transmitter 106 is attached directly to a plant 102. In some implementations, plant links 120 may attach a plant 102 to more than one vibration transmitter 106. In some implementations, a plant 102 may be trained in a particular fashion or direction, see for example, FIGS. 5, 7A, or FIG. 7B. In some instances, a plant link 120 may be formed by the plant 102 itself. For example, a vine or bine may wrap around a vibration transmitter 106, an actuator support 114, a transmitter support 112, or the actuator itself.

In some implementations, the plant link 120 is a wire tie or a purse-lock twist tie. In some implementations, a plant link 120 may be a strip of fabric, an elastomeric band, a staple, or the like. In these instances, the plant link 120 may be expandable to encompass an increased girth as the plant portion expands, such as due to growth, and may be reusable or re-attachable to allow the plant link 120 to be connected and disconnected as needed to reposition the plant as it grows.

In an assembled system 100 the actuator 108 may be attached to the actuator support 114 or to a vibration transmitter directly, as described. The actuator support 114 may be attached to both the actuator 108, such as with an actuator attachment portion 116. The actuator support 114 may be attached to the vibration transmitter 106. The vibration transmitter 114 maybe a supported or tensioned by a transmitter support 112. One or more plants 102 may be attached to the vibration transmitter such as with a plant link 120. The vibration transmitter 106 may be in contact with the growing medium in which the one or more plants 102 or seeds are growing The actuator 108 may receive vibration content such as captured biometric information, a song, frequency, recorded sound, or the like. The actuator may convert the vibration content to vibrations 110. The vibrations 110 may propagate from the actuator 108 to the other parts of the system 110 including the actuator support 114, the vibration transmitter 106, the transmitter support 112, and into the plant and/or growing medium. Where seeds are to be vibrated such as during germination and sprouting, the vibration transmitter 106 may be in contact with the growing medium 104 such that vibrations transmit through the medium 104 to the seed or sprout. The actuator 108 may play vibration content on a loop, or may select other vibration content such as a playlist such that the vibration content is varied. Vibration content maybe varied at different growth stages of the plant 102. For example, one type of vibration content may be used during germination and sprouting, a second type used during vegetative growth, a third type during flowering, a fourth type during fruiting, and so on.

In some implementations, the actuator support 114 and/or the transmitter support 112 may amplify the vibration 110. For example, the actuator support 114 may have a surface area larger than that of the actuator 108. The magnitude of the vibration may grow larger as the vibration propagates from the actuator 108 to the edges of the actuator support 114. In some examples, the actuator support 114 may have a plate or sheet-like structure that acts like a drumhead, amplifying vibrations applied to it. In some implementations, the transmitter support 112 and/or the actuator support 114 may include an amplifier portion that amplifies the vibration 110. In some implementations, the amplifier portion may be selectively removable from the transmitter support 112 and/or the actuator support 114, respectively.

Figure 6:
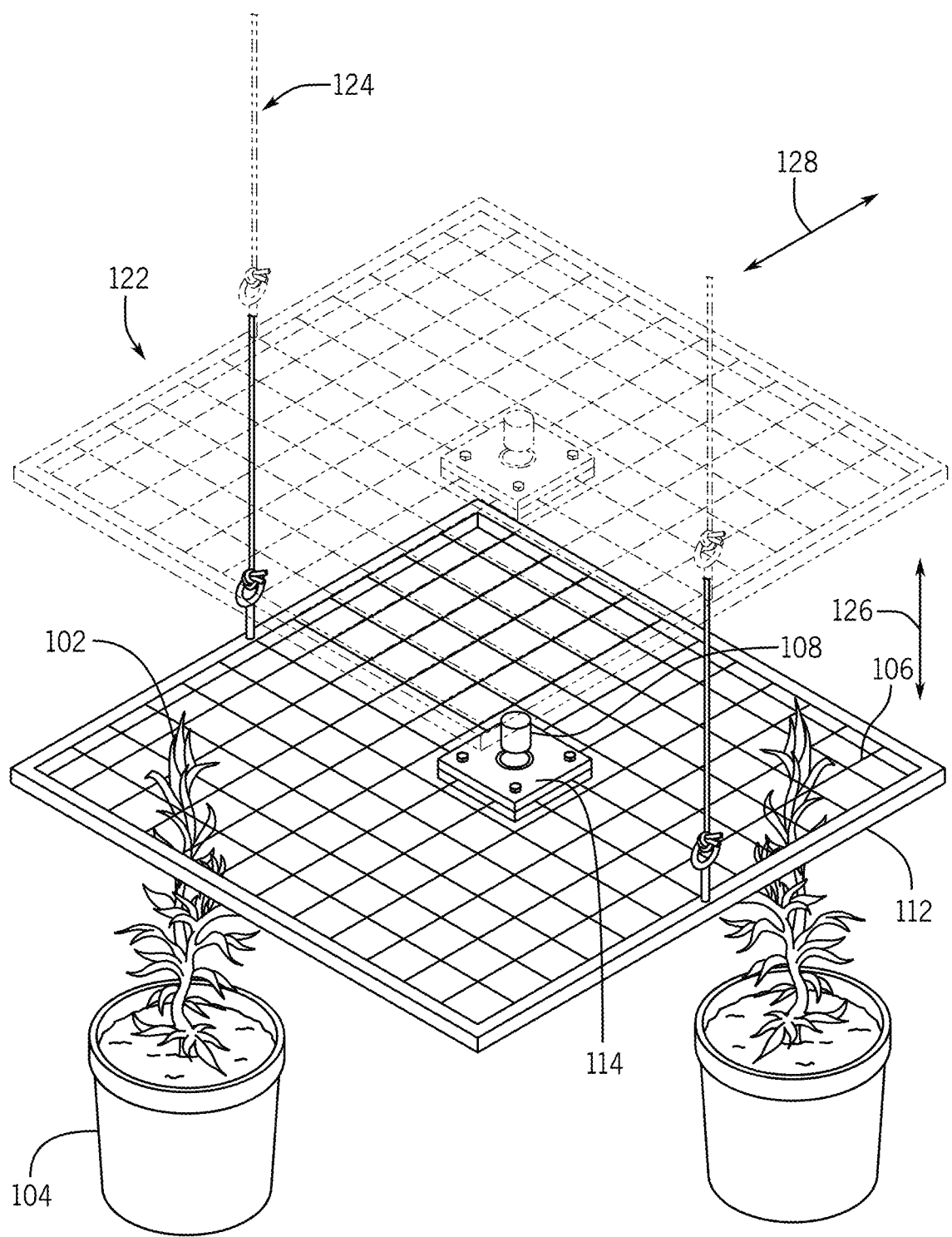
FIG. 6 is an isometric view of the system of FIG. 2 configured to accommodate vertical plant growth.
Figure 7A:
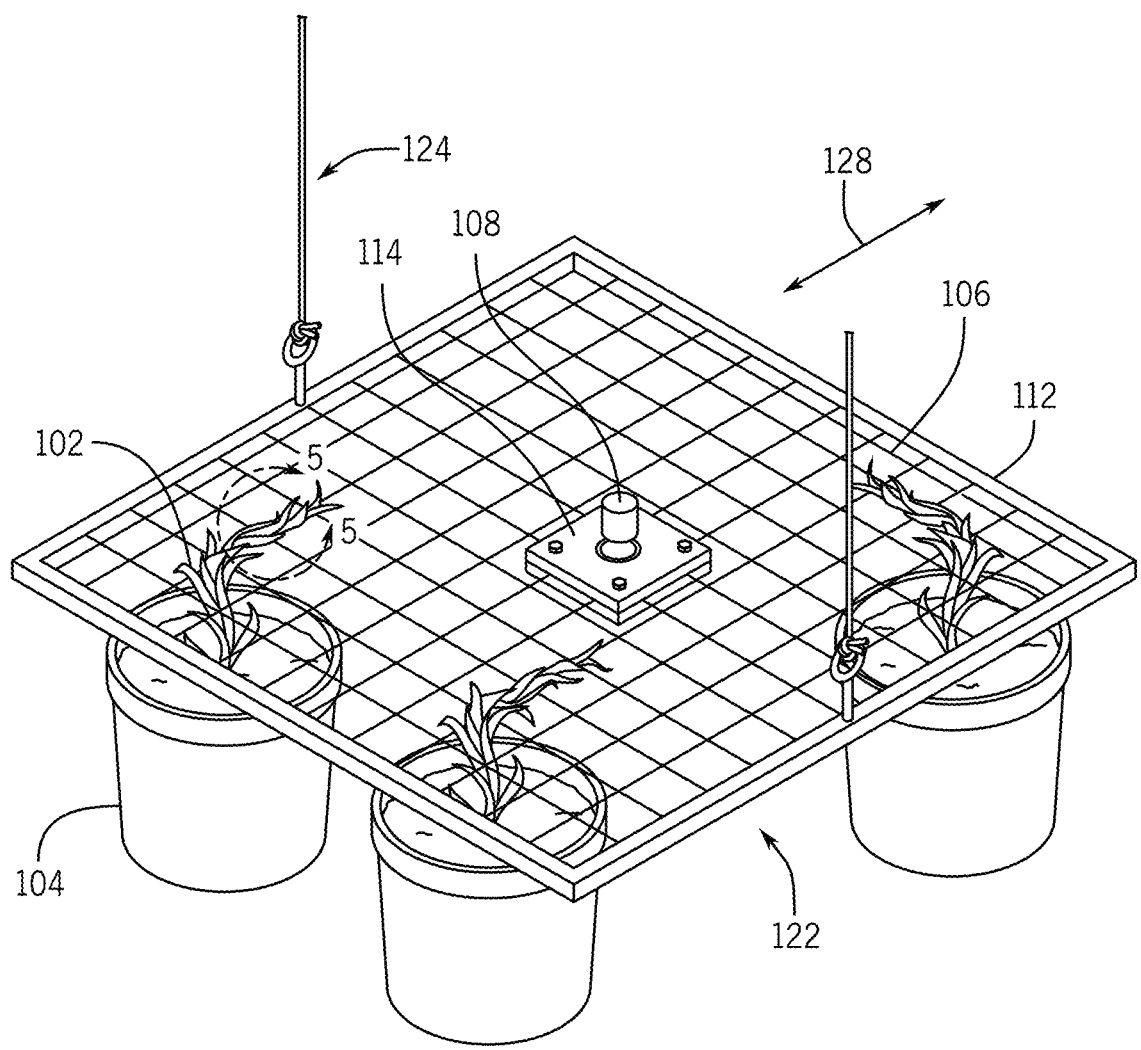
FIG. 7A is an isometric view of the system of FIG. 2 configured to accommodate lateral plant growth.

In some implementations, the actuator 108, the vibration transmitter 106, and/or the vibration unit 122 may be moveable relative to the plant 102. FIGS. 6 and 7A show examples of such implementations. For example, one or more vibration unit hoists 124 may be configured to raise, lower, or laterally move the vibration unit 122 relative to the plant 102. As shown for example in FIG. 6, the vibration unit hoist 124 may move the vibration unit 122 in a vertical direction 126, such as to accommodate growth of the plant 102.

As shown for example in FIGS. 6 and 7A, the vibration unit 122 may be moveable in a lateral direction 128 relative to the plant 102. Such a configuration may be useful for instance when the plant 102 is to be trained horizontally for growth. Horizontal training may have a number of advantages. For example, some plants 102 respond to distress by increasing yields (e.g., high stress training or super cropping). In some implementations, horizontal training may maintain a distance between the plant and a light source substantially constant as the plant 102 grows. In some implementations, a plant 102 may be attached to a vibration unit 122 and a second vibration unit 122 may be placed above the plant 102. As the plant 102 grows to a suitable height relative to the second vibration unit 122, the second vibration unit 122 may be moved in a lateral direction 128, such as to cause the plant 102 to be trained laterally. In some implementations, a sensor (e.g., an infrared sensor) may detect the growth of the plant 102 and cause a motion device (e.g., a motor, piston and cylinder, or the like) to move the vibration unit 122 automatically in a lateral direction 128 and/or a vertical direction 126 in response to the growth of the plant 102. In some implementations, the system 100 may pull a plant 102 through a vibration unit 122. For example, the system may include a first vibration unit 122 to which one or more plants 102 are attached. As the plant 102 grows, the system 100 may pull the plant 102 into contact with s second vibration unit 122. Such implementations may aid in exposing the plant 102 to a proper amount of light as the plant 102 grows.

Figure 7B:
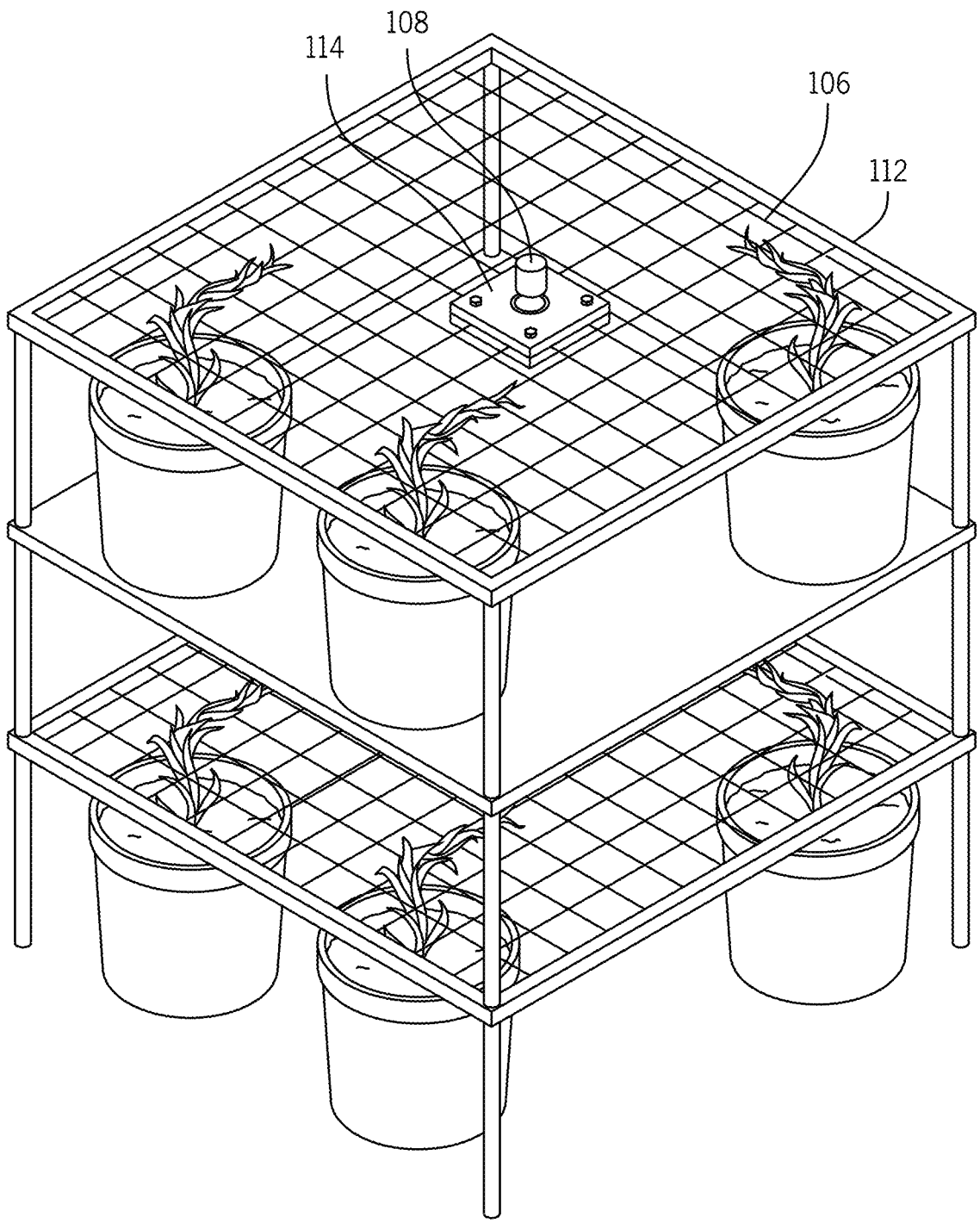
FIG. 7B is an isometric view of multiple systems of FIG. 2 in a stacked configuration.

FIG. 7B shows an example of a system 100 including stacked vibration units 122. The plants 102 may be trained horizontally such as to save growing space and enabling multiple vibration units 122 to be stacked atop one another as shown for example in FIG. 7B.

Figure 8:
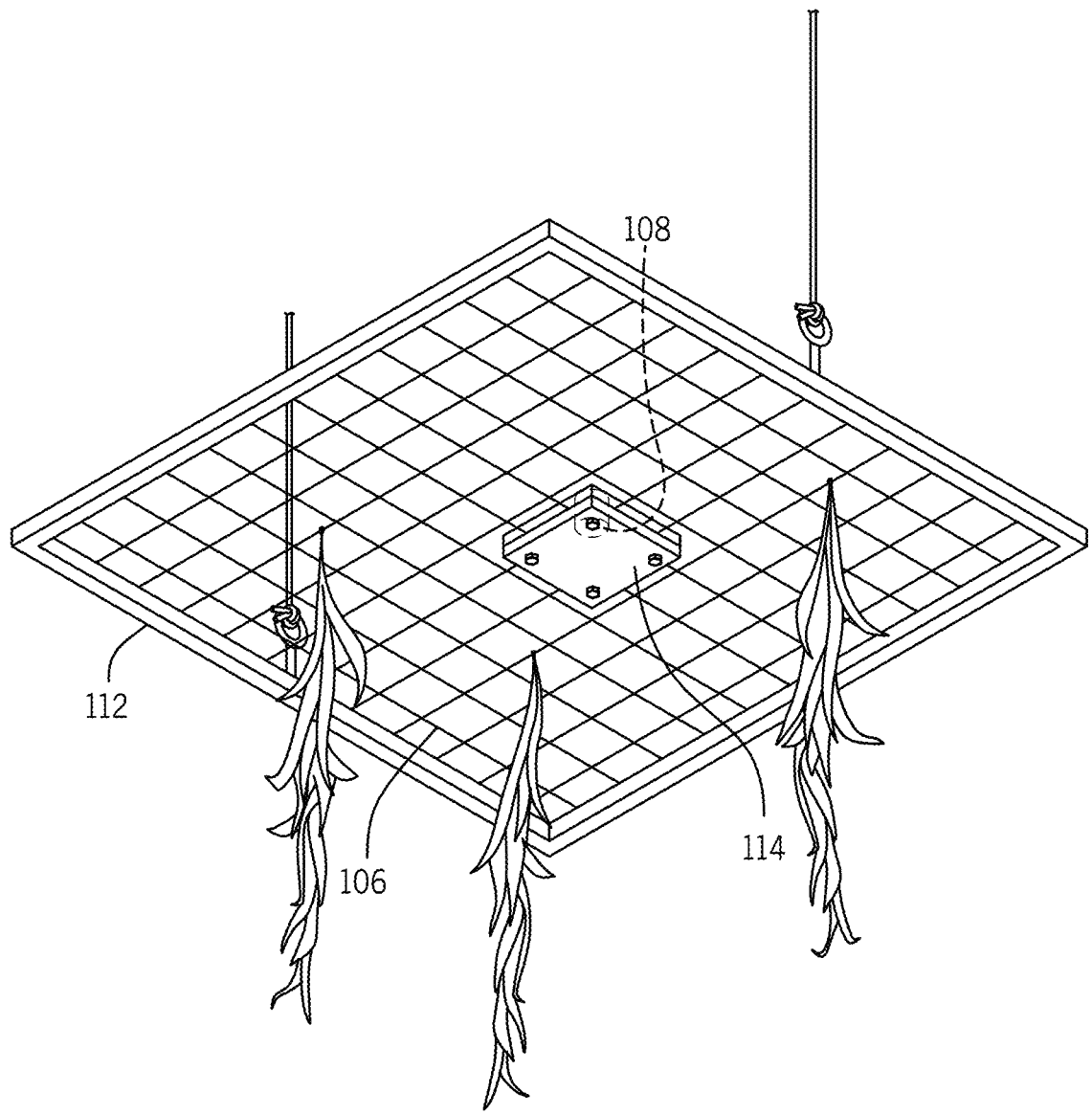
FIG. 8 is an isometric view of the system of FIG. 2 in a harvesting configuration.

FIG. 8 shows an example of a vibration unit 122 configured to dry or cure harvested plants 102. In the configuration shown, the plants 102 have been severed or removed from the growing medium 104 and inverted. Such a configuration may facilitate the harvesting the plants 102. The actuator 108 may be removed from one portion (e.g., the top plate) of the actuator support 114 and connected to another portion (e.g., bottom plate) of the actuator support 114. In other implementations, the actuator 108 may remain on the portion (e.g., the top plate) on which the actuator 108 was positioned during other phases of plant growth. The vibration unit 122 may be removed from a growing area to a curing or drying area or room. For example, the vibration unit 122 may be inserted into a machine (e.g., a bucking machine) that removes the plants from the vibration unit 122, drops the plant 102 material into a receiver (e.g., a hopper). The receiver may trim excess material from the plant and eject a final product.

Figure 9:
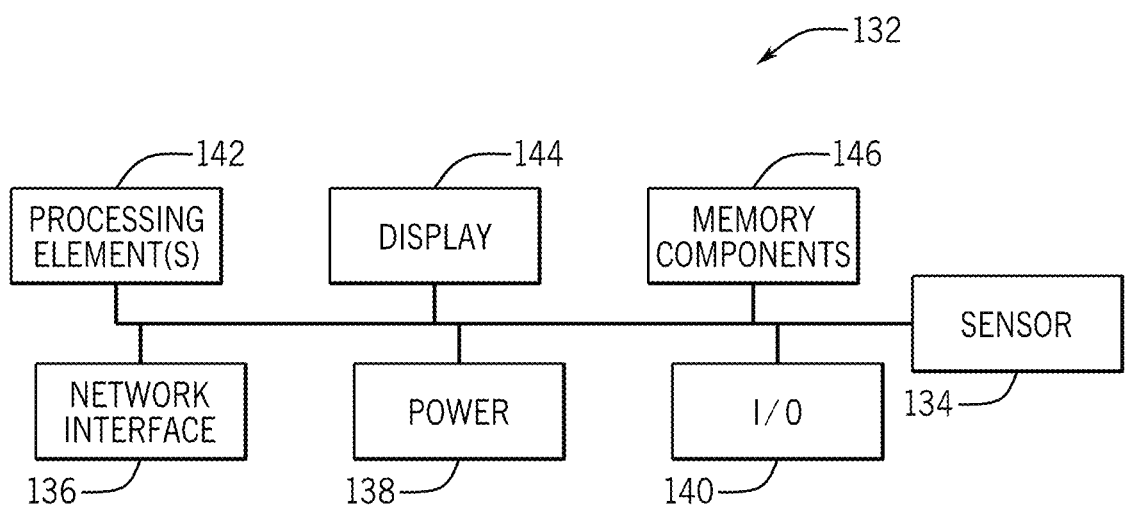
FIG. 9 is a block diagram of components of a user device suitable for use with the system of FIG. 1

FIG. 9 illustrates a simplified block diagram for a user device 132 that may optionally be used with the system 100. The user device 132 may include one or more processing elements 142, an optional display 144, one or more memory components 146, a network interface 136, optional power 138, an optional input/output (I/O) interface 140, and one or more sensors 134 where the various components may be in direct or indirect communication with one another, such as via one or more system buses, contract traces, wiring, or via wireless mechanisms.

The one or more processing elements 142 may be substantially any electronic device capable of processing, receiving, and/or transmitting instructions. For example, the processing elements 142 may be a microprocessor, microcomputer, graphics processing unit, a central processing unit, microcontroller, field programmable gate array, application specific integrated circuit, or the like. It also should be noted that the processing elements 142 may include one or more processing elements or modules that may or may not be in communication with one another. For example, a first processing element may control a first set of components of the computing device and a second processing element may control a second set of components of the computing device where the first and second processing elements may or may not be in communication with each other. Relatedly, the processing elements may be configured to execute one or more instructions in parallel locally, and/or across the network, such as through cloud computing resources.

The display 144 is optional and provides an input/output mechanism for devices of the system 100, such as to display visual information (e.g., images, graphical user interfaces, videos, notifications, and the like) to a user, and in certain instances may also act to receive user input (e.g., via a touch screen or the like). The display may be an LCD screen, plasma screen, LED screen, an organic LED screen, or the like. The type and number of displays may vary with the type of devices (e.g., smartphone versus a desktop computer).

The memory components 146 store electronic data that may store captured vibration content such as frequency spectra, audio files, video files, document files, programming instructions, and the like. The memory components 146 may be, for example, non-volatile storage, a magnetic storage medium, optical storage medium, magneto-optical storage medium, read only memory, random access memory, erasable programmable memory, flash memory, or a tape player, record player, phonograph, a combination of one or more types of memory components.

The network interface 136 receives and transmits data to and from the user device 132 and other devices over a network 130. The network/communication interface 136 may transmit and send data to a network directly or indirectly. For example, the networking/communication interface may transmit data to and from other computing devices and/or the actuator 108 through the network 130. In some examples, the network interface may also include various modules, such as an application program interface (API) that interfaces and translates requests across the network 130.

The various devices of the system 100, such as the actuator 108, may also include a power supply 138. The power supply 138 provides power to various components of the control system. The power supply 138 may include one or more rechargeable, disposable, or hardwire sources, e.g., batteries, power cord, AC/DC inverter, DC/DC converter, or the like. Additionally, the power supply 138 may include one or more types of connectors or components that provide different types of power to the user device 132 or components of the system 100. In some examples, the power supply 138 may include a connector (such as a universal serial bus) that provides power to the computer or batteries within the computer and also transmits data to and from the device to other devices.

The input/output interface 140 allows the system devices to receive input from a user and provide output to a user. The I/O interface may be optional. The input/output interface 140 may include a capacitive touch screen, keyboard, mouse, stylus, or the like. The type of devices that interact via the input/output interface 140 may be varied as desired.

The sensors 134 may be any suitable sensor that can capture vibration content. Some examples include a microphone, accelerometer, gyroscope, pulse sensor, nerve impulse sensor, or the like.

The actuator 108 may include similar components to those in the personal device 132. For example, the actuator 108 may include a processing element 142, memory components 146, network interface 136, power supply 138, a display 144 and/or I/O interface 140.

Figure 10:
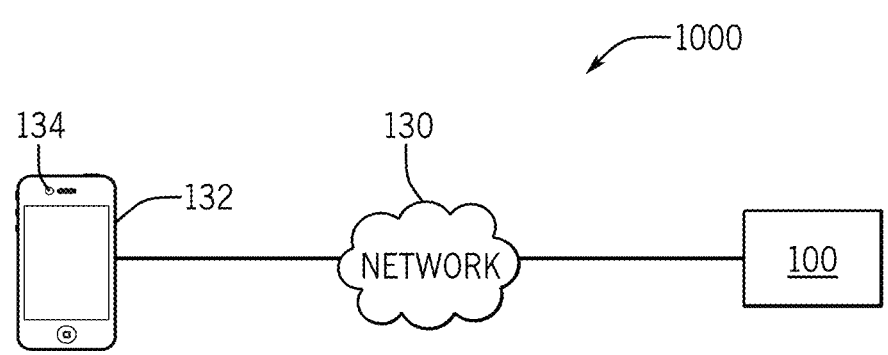
FIG. 10 is a schematic of a system 1000 suitable for use with the user device of FIG. 9 and the system of FIG. 1.

FIG. 10 is a schematic of a system 1000 suitable for use with the system 100 The system 1000 includes a user device 132. The user device 132 may be any suitable device that can capture vibration content. In some examples, the user device 132 is a smart phone, tablet, laptop computer, desktop computer, audio recorder, video or still camera, smart watch, exercise monitor, electrocardiograph, smart speaker, or the like The user device 132 may include a sensor 134 operative to capture vibration content. For example, the sensor 134 may be a microphone that can capture sounds such as a user's voice or heartbeat. In another example, the sensor 134 may be an accelerometer that can capture vibrations such a movement of the user's body such as a heartbeat or the like.

The sensor 134 may measure other biometric data as disclosed herein, such as a pulse or nerve impulses.

In some implementations, the user device 132 may store captured vibration content in the memory 146. In some implementations, live vibration content may be captured and converted to a vibration by the actuator 108 without recording. In some implementations, one or both recorded and live content may be converted by the actuator 108 at the same time to a vibration 110. For example, a user may sing to a recorded track of music. The system 100 may combine the live singing with the recorded music track and convert the combined content into vibrations 110 to be directed to the plant 102. The user device 132 may transmit captured vibration content to the system 100. For example, the user device may transmit the vibration content to the system 100 via the network interface 136 over the network 130. The network 130 may be any wired or wireless network operative to enable communication between the user device 132 and the system 100. For example, the network 130 may be a Wi-Fi network, a cellular telephone network, Wi-Max, Ethernet, Bluetooth, or the like. In other examples, the user device 132 may transmit vibration content to the actuator 108 directly without a network, such as with a cord or cable. The actuator 108 may receive the vibration content and convert the vibration content to a vibration 110 and the system 100 may apply the vibration 110 to the plant 102.

Figure 11:
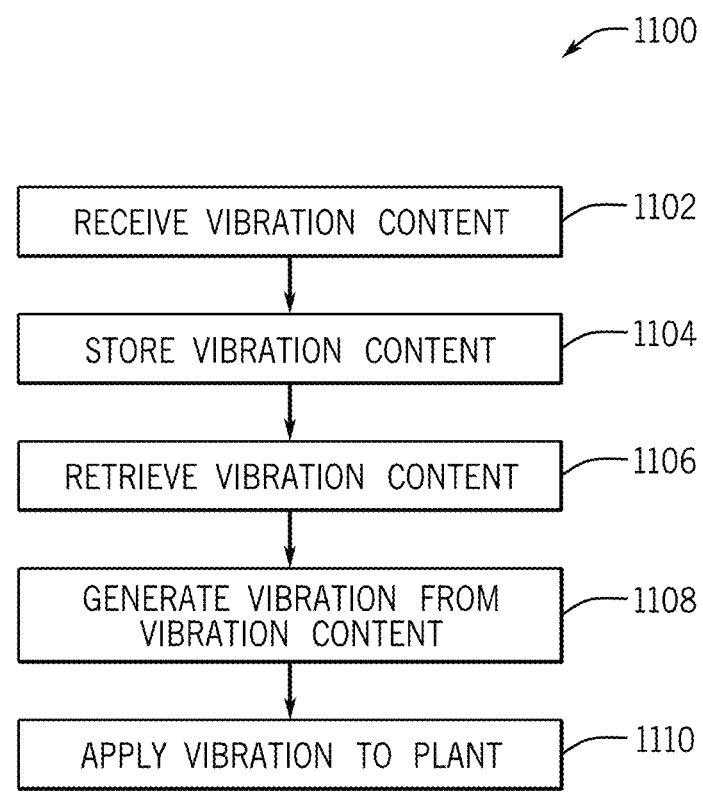
FIG. 11 is a flowchart of a method 1100 for use with the system of FIG. 1.

FIG. 11 is a flowchart of a method 1100 for applying individualized vibration stimulus to a plant. The method 1100 may be used with the system 100 alone or with the system 1000. In many implementations, personal content may be captured and used as vibration content to generate a vibration 110 to be applied to a plant 102 via the system 100. The method 1100 may begin in operation 1102 and vibration content is received. The vibration content may be received by any suitable sensor or transducer. In some implementations, the vibration content may be received by a microphone, a heartbeat monitor, a nerve impulse electrode, an optical sensor, or the like. In some implementations, the vibration content may be received by a sensor 134 associated with a user device 132. In some implementations, the vibration 110 may be based on vibration content such as a sound. In some implementations, the vibration content may be a song; a person's voice; a musical instrument; a generated tone; biometric information such as a heartbeat, pulse, nerve impulses, brain activity, breath sounds, or the like; sounds of nature (e.g., birdsong, a waterfall, an erupting volcano, an earthquake, electromagnetic interference caused by solar flares, a tsunami, hurricane, flood, or tornado, or the like); and so on. The vibration content may be subsonic, sonic, or ultrasonic.

In operation 1104, the vibration content, such as that received in operation 1102, may be stored in a computer-readable medium such as the memory 146. The memory 146 may be a memory associated with a user device 134 and/or a memory associated with the actuator 108 For example, the actuator 108 may include a provision to receive and communicate with a non-volatile memory such as an SD card. The non-volatile memory may include vibration content. In another implementation, the vibration content may be stored on a memory 146 associated with the user device 132. In some implementations, operation 1104 may be optional, such as when live vibration content is captured in operation 1102.

In operation 1106, the vibration content may be retrieved. For example, vibration content stored in a memory 146, such as in operation 1104, may be read from the memory 146. For example, a processing element 142 associated with a user device 132 and/or the actuator 108 may read the memory 146 and load vibration content to a volatile memory such as a random access memory. In some implementations, the user device 132 may transmit the vibration content to the actuator 108, such as via the network 130. In other implementations, the vibration content may be copied from the user device 132 to a mobile memory device 146 such as an SD card. The mobile memory device 146 may be in electrical communication with the actuator 108 such that the actuator 108 can read the vibration content from the memory device 146. In some implementations, operation 1106 may be optional, such as when live vibration content is captured in operation 1102.

In operation 1108, the system 100 may generate a vibration 110 from the vibration content. The processing element 142 may generate an electrical signal based on the vibration content. In some implementations, the actuator 108 generates an electrical signal based on the vibration content and generates a vibration 110 based on the signal. The vibration 110 may be generated by content retrieved as in operation 1106, live content, and/or a combination thereof. In some implementations the electrical signal may be transmitted by a wired or wireless connection to the actuator 108. For example, the electrical signal may be transmitted to the actuator 108 over the network 130 via the network interface 136. The electrical signal may be received by the actuator 108 and converted into a vibration 110.

In operation 1110, the system 100 provides vibration 110 to the plant 102. The actuator 108 transmits the vibration 110 to the plant 102, either directly or through one or more components of the system 100. In many implementations, the actuator 108 may transmit the vibration 110 into the actuator support 114. The vibration 110 may travel through the actuator support 114 into the vibration transmitter 106. The vibration 110 may travel through the vibration transmitter 106 into the plant 102 and/or the growing medium 104. The plant 102 may be attached to the vibration transmitter 106 by one or more plant links 120, although in some implementations, the vibration transmitter 106 transmits the vibration 110 into the plant 102 and/or growing medium 104 directly.

The vibration 110 may be passed into the plant 102 and/or the growing medium 104 at any stage of the plant's lifecycle. For example, the vibration 110 may be passed into seeds, spores, or their growing medium 104 as the seeds or spores sprout. The vibration 110 may be passed into the plant 102 as it grows and matures, including flowering stages if applicable. The vibration 110 may be passed into the plant 102 after harvest, through curing and/or drying, as shown for example in FIG. 8. In some implementations a container configured to hold cloning devices and/or chambers may be in contact with the vibration transmitter 106 and may be vibrated during rooting or other phases of growth As one example, the method 1100 may be used to provided individualized vibration content to a plant 102. A first user may record vibration content, such as an audio recording of his or her heartbeat. For example, in operation 1102 the user may record a heartbeat using a sensor 134 such as a microphone associated with a user device 132. In operation 1104, the user device 132 may store the recorded heartbeat sound in the memory 146. In operation 1106, the user device 132 may transmit the vibration content representing the heartbeat to the actuator 108. The user device 132 may transmit the heartbeat recording to the actuator 108 by the network 130. Alternately, the heartbeat recording may be copied to a memory device 146 such as an SD card. The SD card may be inserted in an appropriate receptacle associated with the actuator 108. The actuator 108 may read the heartbeat recording. In operation 1108, the actuator 108 may convert the heartbeat recording into a vibration 110. In operation 1110, the system 100 may transmit the vibration 110 representing the heartbeat to a plant 102. The plant 102 may be grown for a time while subjected to the heartbeat vibration 110. After growing for a certain amount of time, the plant 102 may be removed from the system 100 and given to a second user with whom the first user has, or wishes to form, a personal connection. For example, a parent may grow a rose using the systems and methods disclosed herein, and give the rose to a child who is about to leave the family home for college.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A system for applying a vibration to a plant comprising:
   an actuator configured to generate the vibration;
   an actuator support including an upper plate and a lower plate, wherein the actuator support vibrates in response to the vibration generated by the actuator, and the vibration is configured to propagate through the upper plate and the lower plate; and
   a vibration transmitter including a mesh at least partially disposed between the upper plate and the lower plate and configured to receive the vibration via the upper plate and the lower plate and to transmit the vibration to the plant;
   wherein the actuator, the actuator support, and the vibration transmitter form a vibration unit that vibrates and the mesh of the vibration transmitter is under tension to enhance the transmission of the vibration to the plant without substantial attenuation of the vibration.

2. The system of claim 1, wherein the vibration is one of an acoustic wave or a mechanical wave.

3. The system of claim 1, wherein the actuator is connected to the actuator support and is configured to transmit the vibration to the actuator support.

4. The system of claim 3, wherein the actuator support amplifies the vibration.

5. The system of claim 4, wherein the vibration transmitter is connected to the plant and is configured to transmit the vibration into the plant.

6. The system of claim 5, wherein the vibration transmitter is connected to the plant by a plant link.

7. The system of claim 6, wherein the plant link is one of a wire tie, an elastomeric band, or a purse-lock tie.

8. The system of claim 7, wherein:
   the actuator includes a vibration speaker;
   the vibration transmitter comprises a portion of the mesh disposed between the upper plate and the lower plate of the actuator support, wherein the upper plate, the portion of the vibration transmitter, and the lower plate are attached together by a fastener;
   a transmitter support is attached to and supports the vibration transmitter, the transmitter support is configured to amplify the vibration generated by the actuator.

9. The system of claim 8, wherein the vibration unit further includes
   the transmitter support.

10. The system of claim 9, wherein the vibration unit is moveable relative to the plant.

11. The system of claim 10, wherein:
a sensor detects growth of the plant; and
a motion device automatically moves the vibration unit in response to the detected growth.

12. The system of claim 11, wherein the vibration unit moves in one of a vertical direction or a horizontal direction relative to the plant.

13. The system of claim 1, wherein:
the upper plate and the lower plate of the actuator support each include a surface area larger than a surface area of the actuator; and
the vibration includes a magnitude that is configured to increase as the vibration propagates from the actuator to edges of the upper plate and the lower plate.

* * * * *